UNITED STATES PATENT OFFICE 2,352,950

ANTIOXIDANT

Charles W. Gates, Naugatuck, Conn., assignor to United States Rubber Company, New York, N. Y., a corporation of New Jersey No Drawing. Application January 3, 1942,
Serial No. 425,575

13 Claims. (Cl. 260—508)

This invention relates to improvements in antioxidants.

An object of the invention is to provide chemicals which may be used per se for retarding the deterioration of organic substances which tend to deteriorate by absorption of oxygen from the air, such as rubber or allied gums, artificial rubber-like materials, such as neoprene (polychloroprene), and buna (polyolefines), unsaturated fatty oils such as unsaturated vegetable oils, essential oils, petroleum oils and their derivatives, such as gasoline, soaps, aldehydes, paints, and the like. Another object is to provide a class of rubber antioxidants which preserve light or white rubber goods with a minimum discoloration during aging. Further objects will be apparent from the following description.

According to the invention, the organic substance has incorporated therein a chemical having the probable general formula $(HO)_x$—R—$(NH-SO_2-R')_n$ where $x$ represents a whole number which may be one or more; R is an aromatic nucleus; R' is an alkyl or aryl group; and $n$ represents a whole number which may be one or more.

The materials are called sulfonyl amino phenols, the word "phenols" being here given a broad meaning to include the sulfonyl amino naphthols. The products are, in general, light-colored crystalline chemicals having practically no odor and they can be easily incorporated into rubber.

The following equation is illustrative of the usual preparation of chemicals of this type. Other methods may be used however to prepare these chemicals.

HO—R—NH$_2$ + R'SO$_2$Cl + NaOOCCH$_3$ ⟶

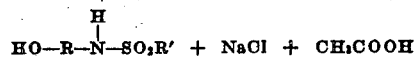

HO—R—N—SO$_2$R' + NaCl + CH$_3$COOH

The products of the invention are usually prepared by reacting amino phenols or amino naphthols with sulfonyl chlorides at elevated temperatures in the presence of a neutralizing base. A suitable neutralizing base such as sodium acetate or sodium carbonate may be used. Organic solvents, such as alcohol, acetone, methyl ethyl ketone, dioxane, benzene, etc. may also be used.

Included among suitable amino phenols broadly for the purpose of the invention are:

p-Aminophenol
m-Aminophenol
o-Aminophenol
2,4-diaminophenol
3,4-diaminophenol
5-amino-1-naphthol
2-aminoresorcinol
1,6-diamino-2-naphthol
2,4-diaminoresorcinol
2-amino-5-hydroxytoluene
3,5-diamino-o-cresol.

It is to be understood that the acid salts of these amino phenols may be used for preparing the antioxidant, as for example, 2,4-diaminophenol dihydrochloride.

The amino phenols or amino naphthols may be polyhydroxy, and there may be one or more primary amine groups present. Various substituted groups may be present in the nucleus of the amino phenol or amino naphthol, as for example, alkyl, alkoxy, alkenyl, alkenyloxy, aryl, secondary amino, tertiary amino, mercapto, etc.; as exemplified by methyl, methoxy, isopropyl, isopropenyl, methallyloxy, butylamino, mercapto, etc.

Examples of the sulfonyl chlorides are as follows: p-toluene sulfon chloride, benzene sulfon chloride, naphthalene-beta-sulfon chloride, ethyl sulfon chloride, methyl sulfon chloride, etc.

The following examples are given in support of the invention, but are to be understood as illustrative only and not limiting thereof:

EXAMPLE 1

2,4-diaminophenol dihydrochloride (40 grams) is slurried in 95% ethyl alcohol (230 grams) at 53° C. A sodium acetate solution containing 125 grams of sodium acetate trihydrate in 60 grams of water is added at 53° C. with stirring. The crystalline p-toluene-sulfonchloride (80 grams) is added to the agitated mixture. During the addition the temperature rises from 53° C. to 65° C. The reaction mass is maintained at 65–70° C. for two hours, and then allowed to cool to room temperature. The reaction mixture is filtered, the precipitate washed free of chlorides, and then recrystallized from methanol. The yield is excellent. The product is named 2,4-(p-toluenesulfonylamino) phenol

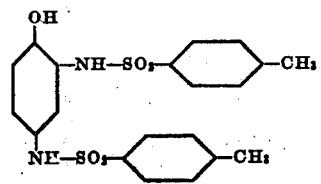

The melting range of the 2,4-(p-toluenesulfonylamino) phenol as prepared above is 237 C. It is a white, odorless, crystalline body.

|  | Found | Theory |
|---|---|---|
| Per cent nitrogen | 6.46 | 6.50 |
| Per cent sulfur | 14.79 | 14.86 |

EXAMPLE 2

This chemical is prepared as in Example 1 from o-aminophenol (25 grams), sodium acetate trihydrate (35 grams), and p-toluenesulfonchloride (70 grams). The compound melts at 142.5° C. and is a white crystalline material. It is named o-(p-toluenesulfonylamino) phenol

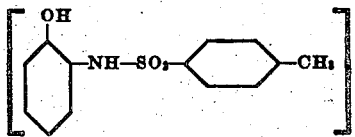

|  | Found | Theory |
|---|---|---|
| Per cent nitrogen | 5.68 | 5.32 |
| Per cent sulfur | 12.27 | 12.15 |

EXAMPLE 3

This chemical is prepared as in Example 1 from p-aminophenol (25 grams), sodium acetate trihydrate (35 grams), and naphthalene beta sulfonyl chloride (52 grams). The compound melts at 167–179° C. and is a light brown crystalline product. It is named p-(beta-naphthalenesulfonylamino) phenol

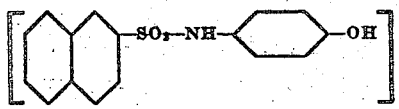

|  | Found | Theory |
|---|---|---|
| Per cent nitrogen | 4.68 | 4.68 |
| Per cent sulfur | 10.50 | 10.70 |

EXAMPLE 4

This chemical is prepared as in Example 1 from p-aminophenol (100 grams), sodium acetate trihydrate (140 grams), and p-toluenesulfonchloride (280 grams). The compound is a white crystalline material melting at 148.5° C. It is named p-(p-toluenesulfonylamino) phenol

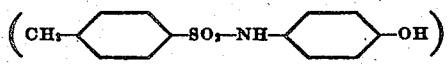

|  | Found | Theory |
|---|---|---|
| Per cent nitrogen | 5.35 | 5.32 |
| Per cent sulfur | 11.98 | 12.15 |

EXAMPLE 5

This chemical is prepared as in Example 1 from 5-amino-1-naphthol hydrochloride (30.8 grams), sodium acetate trihydrate (45 grams), and p-toluenesulfonchloride (30 grams). The compound is light brown in color and melts at 138.5° C. It is named 5-(p-toluenesulfonylamino)-1-naphthol

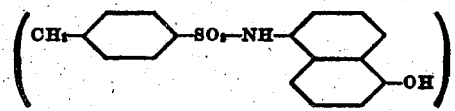

|  | Found | Theory |
|---|---|---|
| Per cent nitrogen | 4.35 | 4.47 |
| Per cent sulfur | 10.03 | 10.25 |

The effectiveness of the materials is shown below, when tested in a white molded rubber compound of the following composition, the parts being by weight:

*Master batch*

| Pale crepe | 100.00 |
|---|---|
| Zinc oxide | 10.00 |
| Lithopone | 60.00 |
| Whiting | 60.00 |
| Zinc soap of cocoanut oil fatty acids | 0.50 |
| Sulfur | 3.00 |
| Tetramethyl thiuram monosulfide | 0.15 |
|  | 233.65 |

The antioxidant to be tested was incorporated in the ratio of one (1.0) part to one hundred (100) parts of pale crepe. Cures were made for 10, 20, and 30 minutes at 30 pounds per square inch steam pressure.

The following data shows the tensile in pounds per square inch and percent elongation at break before and after aging 96 hours in oxygen bomb under 300 pounds pressure and at 70° C.

| Cure at 30 lbs. | Control | 2,4-(p-toluenesulfonylamino) phenol |
|---|---|---|
| UNAGED | | |
| 10 mins | 2,600–736 | 2,500–730 |
| 20 mins | 2,520–733 | 2,400–710 |
| 30 mins | 2,160–726 | 2,000–690 |
| AGED | | |
| 10 mins | 1,700–703 | 2,000–723 |
| 20 mins | 400–366 | 1,740–696 |
| 30 mins | (¹) | 1,330–676 |

| Cure at 30 lbs. | Control | o-(p-toluenesulfonylamino) phenol |
|---|---|---|
| UNAGED | | |
| 10 mins | 2,600–736 | 2,040–725 |
| 20 mins | 2,520–733 | 2,250–720 |
| 30 mins | 2,160–726 | 2,000–706 |
| AGED | | |
| 10 mins | 1,700–703 | 1,750–720 |
| 20 mins | 400–266 | 1,360–696 |
| 30 mins | (¹) | 800–650 |

| Cure at 30 lbs. | Control | p-(beta-naphthalenesulfonylamino) phenol |
|---|---|---|
| UNAGED | | |
| 10 mins | 2,600–736 | 2,480–710 |
| 20 mins | 2,520–733 | 2,340–706 |
| 30 mins | 2,160–726 | 2,030–730 |
| AGED | | |
| 10 mins | 1,700–703 | 1,870–713 |
| 20 mins | 400–366 | 1,340–683 |
| 30 mins | (¹) | 540–580 |

| Cure at 30 lbs. | Control | p-(p-toluenesulfonylamino) phenol |
|---|---|---|

| | UNAGED | |
|---|---|---|
| 10 mins | 2,410-706 | 2,290-716 |
| 20 mins | 2,300-663 | 2,380-693 |
| 30 mins | 2,160-656 | 2,200-672 |

| | AGED | |
|---|---|---|
| 10 mins | 800-346 | 1,560-629 |
| 20 mins | (¹) | 1,000-600 |
| 30 mins | (¹) | 380-456 |

| Cure at 30 lbs | Control | 5-(p-toluene-sulfonylamino)-1-naphthol |
|---|---|---|

| | UNAGED | |
|---|---|---|
| 10 mins | 2,500-736 | 2,500-762 |
| 20 mins | 2,200-740 | 2,250-740 |
| 30 mins | 1,800-710 | 2,000-710 |

| | AGED | |
|---|---|---|
| 10 mins | 560-610 | 1,840-732 |
| 20 mins | (¹) | 1,540-700 |
| 30 mins | (¹) | 1,100-693 |

¹ Failed.

This class of antioxidants is almost completely non-discoloring to the rubber stock, to white cloth, and to lacquered tape in contact with the rubber stock after nine-day exposures to sunlight through glass. Most commercial antioxidants under the same conditions cause considerable discoloration.

It is to be understood that the invention may be applied to the preservation of natural rubber compositions as well as artificially prepared rubber compositions including reclaimed rubbers and latices of such rubber compositions.

It is also to be understood that other desired filling and compounding ingredients may be incorporated along with the preservative for example in the case of rubber there may be incorporated other accelerators, softeners, etc.

The anti-oxidant may be incorporated in any type of rubber composition such as those used for automobile tires and tubes, hose, belting, sheets and thread rubber, rubberized fabrics, molded goods, boots, and shoes, etc., where vulcanized in a mold, in open steam, in hot air, or in the cold by the so-called acid process. The proportion of the antioxidant may vary from about 0.1% to 5%, although either smaller or greater proportions may be found useful. If the material to which it is added is a liquid such as rubber cement or an oil, the antioxidant may be dissolved there in a suitable small proportion. The antioxidant may be incorporated into solid substances by milling or mastication and prepared for incorporation into dispersions or solutions either in powder, paste, or solution form, or applied in such forms for incorporation by diffusion to the surfaces of vulcanized or unvulcanized rubber goods.

Having thus described my invention, what I claim and desire to protect by Letters Patent is:

1. A method of preserving organic substances which tend to deteriorate by absorption of oxygen from the air which comprises incorporating therein an antioxidant which is a sulfonyl amino phenol, in which the sulphonyl group is attached to the phenol group through the amino group.

2. A method of preserving organic substances which tend to deteriorate by absorption of oxygen from the air which comprises incorporating therein an antioxidant which is an aminophenol having nitrogen of the amino group joined to a sulfonyl radical which is in turn joined to a hydrocarbon group.

3. A method of preserving organic substances which tend to deteriorate by absorption of oxygen from the air which comprises incorporating therein an antioxidant consisting of a compound having the general formula

$$(HO)_x—R—(NH—SO_2—R')_n$$

where $x$ is a whole number; R is an aromatic nucleus; HO refers to a phenolic hydroxy radical, R' is a radical selected from the class consisting of alkyl and aryl radicals; and $n$ represents a whole number.

4. A method which comprises incorporating in a rubber composition an antioxidant which is a sulphonyl amino phenol, in which the sulphonyl group is attached to the phenol group through the amino group.

5. A method which comprises incorporating in a rubber composition an antioxidant which is an aminophenol having nitrogen of the amino group joined to a sulfonyl radical which is in turn joined to a hydrocarbon group.

6. An organic substance which tends to deteriorate by absorption of oxygen from the air containing an antioxidant which is a sulphonyl amino phenol, in which the sulphonyl group is attached to the phenol group through the amino group.

7. A rubber composition containing an antioxidant which is a sulphonyl amino phenol, in which the sulphonyl group is attached to the phenol group through the amino group.

8. An organic substance which tends to deteriorate by absorption of oxygen from the air containing an antioxidant which is a toluene sulphonyl amino phenol, in which the sulphonyl group is attached to the phenol group through the amino group.

9. An organic substance which tends to deteriorate by absorption of oxygen from the air containing an antioxidant which is 2,4-(p-toluenesulfonylamino) phenol.

10. An organic substance which tends to deteriorate by absorption of oxygen from the air containing an antioxidant which is a naphthalenesulphonyl amino phenol, in which the sulphonyl group is attached to the phenol group through the amino group.

11. An organic substance which tends to deteriorate by absorption of oxygen from the air containing an antioxidant which is p-(beta naphthalenesulfonylamino) phenol.

12. An organic substance which tends to deteriorate by absorption of oxygen from the air containing an antioxidant which is a toluene sulphonyl amino naphthol, in which the sulphonyl group is attached to the naphthol group through the amino group.

13. An organic substance which tends to deteriorate by absorption of oxygen from the air containing an antioxidant which is 5-(p-toluenesulfonylamino)-1-naphthol.

CHARLES W. GATES.